United States Patent
Wei et al.

(10) Patent No.: US 10,910,674 B2
(45) Date of Patent: Feb. 2, 2021

(54) ADDITIVE FOR INCREASING LIFESPAN OF RECHARGEABLE ZINC-ANODE BATTERIES

(71) Applicant: RESEARCH FOUNDATION OF THE CITY UNIVERSITY OF NEW YORK, New York, NY (US)

(72) Inventors: Xia Wei, New York, NY (US); Michael Nyce, New York, NY (US); Gautam G. Yadav, New York, NY (US); Alexander Couzis, New York, NY (US); Sanjoy Banerjee, New York, NY (US)

(73) Assignee: RESEARCH FOUNDATION OF THE CITY UNIVERSITY OF NEW NEW YORK, New York, NY (US)

( * ) Notice: Subject to any disclaimer, the term of this patent is extended or adjusted under 35 U.S.C. 154(b) by 0 days.

(21) Appl. No.: 15/769,854

(22) PCT Filed: Oct. 20, 2016

(86) PCT No.: PCT/US2016/057902
§ 371 (c)(1),
(2) Date: Apr. 20, 2018

(87) PCT Pub. No.: WO2017/070340
PCT Pub. Date: Apr. 27, 2017

(65) Prior Publication Data
US 2018/0316064 A1    Nov. 1, 2018

Related U.S. Application Data

(60) Provisional application No. 62/244,244, filed on Oct. 21, 2015.

(51) Int. Cl.
*H01M 10/26* (2006.01)
*H01M 4/38* (2006.01)
(Continued)

(52) U.S. Cl.
CPC ............ *H01M 10/26* (2013.01); *H01M 4/38* (2013.01); *H01M 4/42* (2013.01); *H01M 10/05* (2013.01);
(Continued)

(58) Field of Classification Search
CPC ...... H01M 10/26; H01M 10/28; H01M 10/42; H01M 4/38; H01M 4/36
See application file for complete search history.

(56) References Cited

U.S. PATENT DOCUMENTS 3,956,018 A * 5/1976 Kozawa ................ H01M 4/06
429/206
4,818,642 A * 4/1989 Bellows .............. H01M 12/085
429/105
(Continued)

FOREIGN PATENT DOCUMENTS

| CN | 1627554 A | 6/2005 |
|---|---|---|
| CN | 102299389 A | 12/2011 |

(Continued)

OTHER PUBLICATIONS

Machine Translation of: CN 1627554 A, Liu et al., Jun. 15, 2005.*
(Continued)

*Primary Examiner* — Kenneth J Douyette
(74) *Attorney, Agent, or Firm* — Andrew M. Metrailer

(57) ABSTRACT

A rechargeable battery can include a cathode, an anode current collector, an anode comprising zinc, and an electrolyte in ionic communication with both the cathode and the anode current collector. The electrolyte can include an organic ammonium halide. The organic ammonium halide can include an ammonium bromide in some instances.

30 Claims, 8 Drawing Sheets

(51) Int. Cl.
  *H01M 10/28* (2006.01)
  *H01M 10/0569* (2010.01)
  *H01M 10/36* (2010.01)
  *H01M 10/0567* (2010.01)
  *H01M 10/05* (2010.01)
  *H01M 10/0568* (2010.01)
  *H01M 4/42* (2006.01)
  *H01M 10/42* (2006.01)
  *H01M 4/02* (2006.01)

(52) U.S. Cl.
  CPC ... *H01M 10/0567* (2013.01); *H01M 10/0568* (2013.01); *H01M 10/0569* (2013.01); *H01M 10/28* (2013.01); *H01M 10/36* (2013.01); *H01M 10/4235* (2013.01); *H01M 2004/027* (2013.01); *H01M 2300/0014* (2013.01)

(56) References Cited

U.S. PATENT DOCUMENTS

| | | | | |
|---|---|---|---|---|
| 4,957,833 | A | * | 9/1990 | Daifuku ............... H01M 4/60 429/213 |
| 5,419,987 | A | * | 5/1995 | Goldstein ............. C25C 5/02 205/64 |
| 5,429,895 | A | * | 7/1995 | Lian ................ H01G 9/0425 361/508 |
| 6,083,647 | A | * | 7/2000 | Noda ................. C25D 3/44 429/324 |
| 2002/0064710 | A1 | * | 5/2002 | Kawakami ............ H01M 4/02 429/231.95 |
| 2004/0110063 | A1 | * | 6/2004 | Uchitomi ............. H01M 4/505 429/223 |
| 2005/0189231 | A1 | | 9/2005 | Capper et al. |
| 2011/0027664 | A1 | * | 2/2011 | Burchardt ........... H01M 2/1653 429/403 |
| 2014/0072886 | A1 | | 3/2014 | Urban et al. |

FOREIGN PATENT DOCUMENTS

| | | |
|---|---|---|
| CN | 104752777 A | 7/2015 |
| WO | 2017070340 A1 | 4/2017 |

OTHER PUBLICATIONS

Foreign Communication from a related application—International Search Report and Written Opinion of the International Searching Authority, Application No. PCT/US2016/057902, dated Jan. 17, 2017, 14 pages.

Foreign Communication from a related application—International Preliminary Report on Patentability, Application No. PCT/US2016/057902, dated May 3, 2018, 11 pages.

* cited by examiner

ADDITIVE FOR INCREASING LIFESPAN OF RECHARGEABLE ZINC-ANODE BATTERIES

CROSS-REFERENCE TO RELATED APPLICATIONS

This application is a filing under 35 U.S.C. 371 as the National Stage of International Application No. PCT/US2016/057902, filed Oct. 20, 2016 and entitled "Additive for Increasing Lifespan of Rechargeable Zinc-Anode Batteries", which claims the benefit of and priority to U.S. Provisional Application No. 62/244,244 filed on Oct. 21, 2015 and entitled "Additive for Increasing Lifespan of Rechargeable Zinc-Anode Batteries" by Xia Wei et al., both of which are incorporated herein by reference in their entirety.

STATEMENT REGARDING FEDERALLY FUNDED RESEARCH OR DEVELOPMENT

The invention described and claimed herein was made in part utilizing funds supplied by the Advanced Research Projects Agency-E (APRA-E) of United States Department of Energy (DOE) under Contract No. DE-AR-0000150. The Government has certain rights in this invention.

BACKGROUND

Alkaline battery cells have been predominantly used as primary batteries (e.g., primary batteries, primary electrochemical cells or primary cells), meaning that after a single discharge primary batteries are disposed of and replaced. Primary alkaline batteries are produced in high volume at low cost by numerous commercial manufacturers. However, the one-time use of primary batteries results in large material wastage as well as undesirable environmental consequences. Also, potential economic losses can arise due to the significant imbalance between the energy that is required to manufacture these cells compared to the energy that can actually be stored. As a consequence, there is an advantage to providing rechargeable or secondary cells, also known as secondary batteries, secondary electrochemical cells or secondary cells.

SUMMARY

In an embodiment, a rechargeable battery comprises a cathode, an anode current collector, an anode comprising zinc, and an electrolyte in ionic communication with both the cathode and the anode current collector. The electrolyte can include an organic ammonium halide. The organic ammonium halide can include an ammonium bromide in some instances.

In an embodiment, a rechargeable battery comprises a cathode, an anode current collector, an anode comprising zinc, and an electrolyte in ionic communication with both the cathode and the anode current collector. The electrolyte comprises an alkyl quaternary ammonium compound.

In an embodiment, a method of operating a battery comprises discharging a battery that include a cathode, an anode current collector, an anode comprising zinc, and an electrolyte in ionic communication with both the cathode and the anode current collector, dissolving zinc in the electrolyte during the discharging, charging the battery, and plating zinc on the anode current collector during the charging. The electrolyte comprises an alkyl quaternary ammonium compound. In some instances, the battery can be a flow battery or a non-flow battery.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
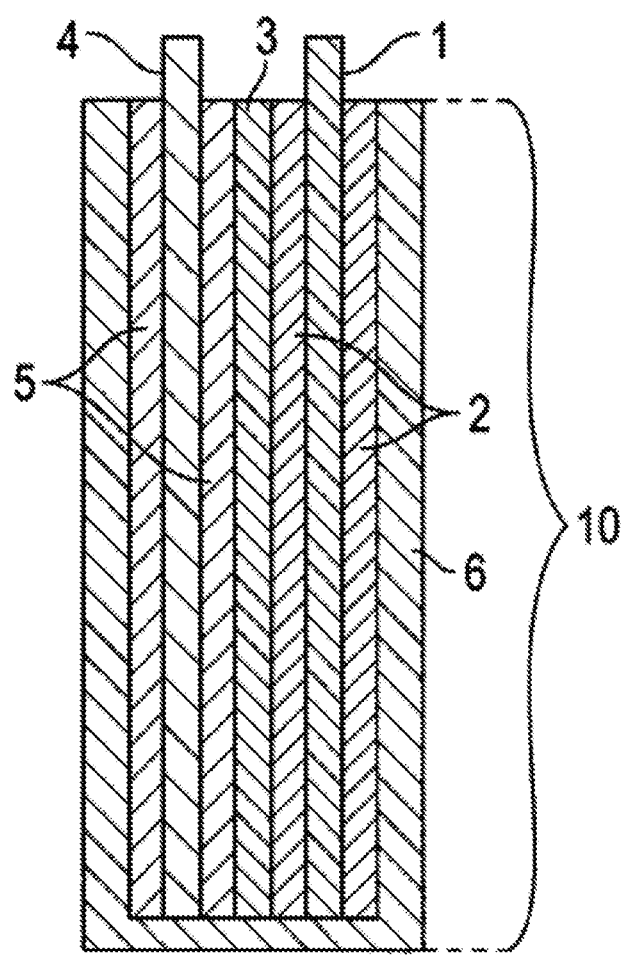
FIG. 1 is a schematic cross-sectional view of a cell according to an embodiment.
Figure 2A:
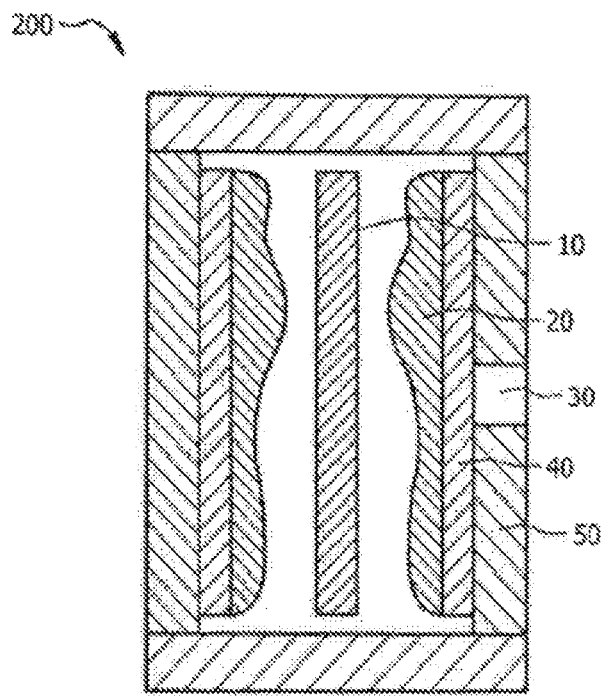
FIGS. 2A and 2B are schematic cross-sectional views of a flow assisted cell according to an embodiment.
Figure 2B:
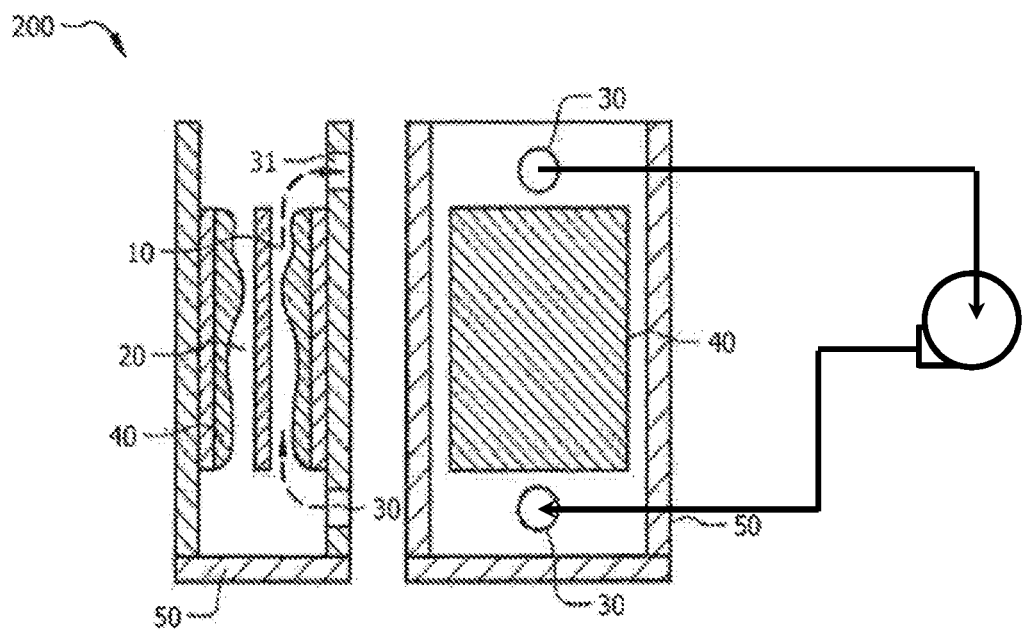

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

In this disclosure, the terms "negative electrode" and "anode" are both used to mean "negative electrode." Likewise, the terms "positive electrode" and "cathode" are both used to mean "positive electrode."

The need for strong and reliable grid-scale energy storages becomes more apparent as cities grow larger due to an ever-growing population. High-powered batteries with the ability to provide long cycle life are useful for providing a variety of energy storage options. During mornings when the demand is low, electricity can be stored through charging, when the demand increases by afternoon, the stored electricity can be used for different applications, and by night when the demand reduces again, the electricity can be stored for further use. In this way, batteries can be used to supplant the electric grid by load leveling and peak shaving when required. In addition, other applications, like, hybrid electrical vehicles, frequency regulations, UPS inverters, etc. can benefit from long cycle-life and supportive energy storages as well. Hence, cheap, clean and low environmental impact energy storages, like rechargeable batteries, gain more and more attention. Among the various rechargeable battery options, rechargeable zinc-anode batteries meet the requirements. However, the challenges that rechargeable zinc-anode batteries are facing are short lifespan time due to non-uniform zinc deposition during charging, hydrogen evolution that compromises energy efficiency, and zinc corrosion during battery resting that leads to further capacity loss.

At high current densities, dendritic zinc depositions can form on the anode current collector during battery charging. Dendritic zinc formation can be accompanied by vigorous hydrogen evolution. Inefficient zinc deposition coupled with the increased likelihood of battery failure through an internal short circuit makes dendritic zinc particularly undesirable. At low current densities, non-uniform, mossy and porous zinc depositions usually form on the anode current collector during battery charging. This type of morphology has higher porosity and poorer electrical contact with the current collector, which leads to higher corrosion rate and progressive loss of battery capacity. Morphological control in battery electrodes, specifically dense and compact zinc deposition, has not been effectively explored. In conventional, non-flowing zinc-anode batteries, a thick concentration boundary layer can form on the anode current collector because of the slow diffusion of zincate ($Zn(OH)_4^{-2}$). Consequently, the system can be driven far from equilibrium, and dendritic zinc deposits can be even further encouraged. In order to have healthier cycle life for the zinc anode, low current densities can be applied to the non-flow battery system. As mentioned above, at low current densities, the adhesion of mossy zinc on anode current collector is weak and eventually this type of morphology can lead to capacity loss by losing active materials. In order to overcoming this restriction, flowing electrolyte can be introduced to a zinc-anode battery system. With flowing electrolyte, mass transfer of zincate becomes more efficient.

During battery resting, electrodeposited zinc is prone to dissolve back into the electrolyte, which results in capacity loss. Since compact and dense zinc has the highest corrosion resistance, it is desirable to have this type zinc morphology in zinc-anode rechargeable batteries. A wide variety of additives such as lead oxide, bismuth oxide, and organic chemicals can be used in the electrolyte. However, there is a lack of research on studying the impact of additives on the cycling performance of zinc anode and self-discharge of batteries.

Periodic reconditioning is a method that can be used to clean off all the zinc deposits and to resolve efficiency imbalances between two electrodes. The reconditioning procedure is to discharge a battery to a lower voltage. It enables the deposited metal on the anode substrate to dissolve fully into the electrolyte. However, it is not only time consuming, but it can also lower the overall energy efficiency of the battery. Thus, it is desirable to minimize the frequency of reconditioning cycles. At present, in batteries, by introducing effective battery additives, which can suppress hydrogen evolution and self-discharge of zinc anode and control the morphology of zinc deposition in a desired way, time between reconditioning can be extended.

This disclosure is targeted at increasing lifetime of rechargeable zinc-anode batteries by introducing novel combinations of organic additives and inorganic additives. The addition of organic additive and inorganic additives can either occur alone or in combinations of both types of additives into the electrolyte. Due to the surface adsorption function of cationic type of organic additives with the negatively charged electrode surface ($Zn(OH)_4^{-2}$) and substrate effect of inorganic additives on a zinc anode, hydrogen evolution and the self-discharge of the zinc anode can be suppressed and the zinc morphology can be modified to be compact. The additives can have synergic effects on modifying zinc morphology and alleviating zinc corrosion during battery resting. With the presence of the additives, the cycle life of zinc-anode batteries can reach more than 2000 cycles without deep cleaning zinc deposits. Compact and dense zinc morphology is an important key to operating the battery longer. The results from this disclosure have shown that it allows the zinc anode work for 2000+ cycle at a small scale (0.18 Ah) and 400+ cycles at large scales (50 KWh).

In an embodiment, a rechargeable battery comprises a battery compartment, a cathode, an anode, and an electrolyte solution. This disclosure is directed to battery additives including electrolyte additives, which inhibit zinc corrosion and hydrogen evolution, and at the same time, generate more compact and denser zinc deposition.

FIG. 1 illustrates various views of a battery or cell 10 having a housing 6, a cathode current collector 1, a cathode material 2, a separator 3, an anode current collector 4, and an anode material 5. An electrolyte is dispersed in an open space throughout the battery 10. In some contexts, the combination of the cathode current collector 1 and the cathode material 2 are collectively referred to as either the cathode or the positive electrode. In some contexts, the combination of the anode current collector 4, and the anode material are collectively referred to as either the anode or the negative electrode.

In an embodiment, a secondary battery may comprise a battery housing, a cathode, a Zn anode, and an electrolyte solution; wherein the cathode, the Zn anode, and the electrolyte solution are supported within the battery housing. As will be appreciated by one of skill in the art, and with the help of this disclosure, during the operating life of the battery, while the battery is in a discharge phase (e.g., the battery is producing energy, thereby acting as a galvanic cell), the cathode is a positive electrode and the Zn anode is a negative electrode; and while the battery is in a recharging phase (e.g., the battery is consuming energy, thereby acting as an electrolytic cell), the polarity of the electrodes is reversed, i.e., the cathode becomes the negative electrode and the Zn anode becomes the positive electrode.

As will be appreciated by one of skill in the art, and with the help of this disclosure, the number of electrodes in a secondary battery is dependent upon the desired parameters for such secondary battery. In an embodiment, the number and size of each of the electrodes (e.g., Zn anode, the cathode) in a secondary battery can be chosen based on the properties of the electrodes, such that Zn anode and cathode capacities are balanced.

In an embodiment, the housing can comprise a molded box or container, such as a thermoplastic polymer molded box (e.g., a polysulfone molded box), a thermoplastic olefin polymer molded box, or the like. As shown in FIG. 1, the electrodes may be in a prismatic geometry/configuration. While prismatic configurations are illustrated in FIG. 1, other, non-prismatic designs can also be used. For example, a cylindrical or other design can also be used with the appropriate configuration of the electrodes and separator. In some embodiments, the battery may comprise a prismatic configuration, cylindrical configuration, bi-polar configuration, or coin cell configuration.

The cathode material 2 can comprise a variety of materials that are suitable for use with an anode material 5 comprising zinc such as nickel oxyhydroxide (Zn/NiOOH), silver oxide (Zn/Ag$_2$O), and/or manganese dioxide (Zn/MnO$_2$). In some embodiments, the use of the NiOOH material can result in the following reactions:

Positive electrode:  $2Ni(OH)_2 + 2OH^- \rightarrow 2NiOOH + 2H_2O + 2e^-$ Negative electrode: 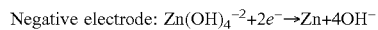 $Zn(OH)_4^{-2} + 2e^- \rightarrow Zn + 4OH^-$ Overall reaction: 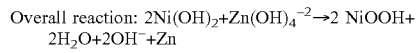 $2Ni(OH)_2 + Zn(OH)_4^{-2} \rightarrow 2NiOOH + 2H_2O + 2OH^- + Zn$ During charging, nickel hydroxide is oxidized to nickel oxyhydroxide at the cathode, and zincate (Zn(OH)4-2) is reduced to zinc, which can be deposited on the anode current collector. The theoretical open-circuit voltage of a zinc-nickel battery is 1.72 V.

In some embodiments, the cathode material 2 can comprise a mixed material comprising manganese dioxide. The mixed material can be a combination of manganese dioxide (MnO$_2$, also referred to as MD), a conductive material, and a binder. In some embodiments, additional materials including bismuth and copper can be present with the manganese dioxide. In an embodiment, conductive carbon is also present in the cathode material 2. The mixed cathode material 2 can be based on one or many polymorphs of MnO2, including electrolytic (EMD), α-MnO2, β-MnO2, γ-MnO2, δ-MnO2, ε-MnO2, or λ-MnO2.

The cathode material 2 can also comprise a conductive material such as a conductive carbon. The addition of the conductive carbon may enable high loadings of MnO$_2$ in the mixed material, resulting in high volumetric and gravimetric energy density. The conductive carbon can be present in an amount between about 2 wt. % to about 30 wt %. Such conductive carbon can include single walled carbon nanotubes, multiwalled carbon nanotubes, graphene, carbon blacks of various surface areas, and others that have specifically very high surface area and conductivity. Higher loadings of the MnO$_2$ in the mixed material electrode are, in some embodiments, desirable to increase the energy density. Other examples of conductive carbon include TIMREX Primary Synthetic Graphite (all types), TIMREX Natural Flake Graphite (all types), TIMREX MB, MK, MX, KC, B, LB, and any combinations thereof.

In some embodiments, the cathode material 2 can include a binder. The binder can be present in an amount of between about 0.01 wt. % to about 10 wt. %. In an embodiment, the binder comprises a water-soluble cellulose-based hydrogel, which are used as thickeners and strong binders, and are cross-linked with good mechanical strength with conductive polymers. The binder may also be a cellulose film sold as cellophane. The binders can be made by physically cross-linking the water-soluble cellulose-based hydrogels with a polymer through repeated cooling and thawing cycles. In some embodiments, a carboxymethyl cellulose (CMC) solution in an amount between about 0.01 wt. % and about 10 wt. % can be cross-linked with between about 00.01 wt. % and about 10 wt. % polyvinyl alcohol (PVA) on an equal volume basis. The binder, compared to TEFLON®, shows superior performance. TEFLON® is a very resistive material, but its use in the industry has been widespread due to its good rollable properties. This, however, does not rule out using TEFLON® as a binder. Mixtures of TEFLON® with the aqueous binder and some conductive carbon were used to create rollable binders.

The binder can include hydrogels. Examples of suitable hydrogels can include, but are not limited to, methyl cellulose (MC), carboxymethyl cellulose (CMC), hydroypropyl cellulose (HPH), hydroypropylmethyl cellulose (HPMC), hydroxethylmethyl cellulose (HEMC), carboxymethylhydroxyethyl cellulose and hydroxyethyl cellulose (HEC). Examples of crosslinking polymers include polyvinyl alcohol, polyvinylacetate, polyaniline, polyvinylpyrrolidone, polyvinylidene fluoride and polypyrrole. In an embodiment, a 0.01 wt. % to 10 wt % solution of water-cased cellulose hydrogen is cross linked with a 0.01 wt. % to 10% wt solution of crosslinking polymers by, for example, repeated freeze/thaw cycles, radiation treatment or chemical agents (e.g. epichlorohydrin). The aqueous binder may be mixed with between about 0.01 wt % and about 5 wt. % TEFLON® to improve manufacturability.

In some embodiments, additional metals or materials can be present in the cathode. In some embodiments, the cathode can comprise vanadium, copper, cadmium, bromide, chlorine, lithium, silver, air, sodium, compounds or salts thereof, or any combination thereof.

The cathode material 2 can be adhered to the cathode current collector 1 by pressing at, for example, a pressure between 1,000 psi and 20,000 psi. The cathode material 2 may be adhered to the cathode current collector 1 as a paste and/or as a pre-dried sheet. A tab of each current collector extends outside of the device to provide for an electrical connection to the cathode current collector 1. In some embodiments, the tab may cover less than 0.2% of the electrode area.

The cathode current collector 1 may be a conductive material to serve as an electrical connection between the cathode material 2 and the external electrical connections. In some embodiments, the cathode current collector 1 can be, for example, nickel, nickel-coated steel, tin-coated steel, silver coated copper, copper plated nickel, nickel plated copper or similar material. The cathode current collector 1 may be formed into an expanded mesh, perforated mesh, foil or a wrapped assembly.

The anode material 5 comprises zinc, which can be present as elemental zinc or zinc oxide. In some embodiments, the non-flow cell Zn anode mixture comprises Zn, zinc oxide (ZnO), an electronically conductive material, and a binder. The Zn may be present in the anode material 5 in an amount of from about 50 wt. % to about 90 wt. %, alternatively from about 60 wt. % to about 80 wt. %, or alternatively from about 65 wt. % to about 75 wt. %, based on the total weight of the anode material 5. In an embodiment, Zn may be present in an amount of about 85 wt. %, based on the total weight of the anode material 5.

In some embodiments, ZnO may be present in an amount of from about 5 wt. % to about 20 wt. %, alternatively from about 5 wt. % to about 15 wt. %, or alternatively from about 5 wt. % to about 10 wt. %, based on the total weight of anode material 5. In an embodiment, ZnO may be present in anode material 5 in an amount of about 10 wt. %, based on the total weight of the anode material 5. As will be appreciated by one of skill in the art, and with the help of this disclosure, the purpose of the ZnO in the non-flow cell Zn anode mixture is to provide a source of Zn during the recharging steps, and the zinc present in either form can be converted during charging and discharging phases.

In an embodiment, an electronically conductive material may be present in the anode material 5 in an amount of from about 5 wt. % to about 20 wt. %, alternatively from about 5 wt. % to about 15 wt. %, or alternatively from about 5 wt. % to about 10 wt. %, based on the total weight of the anode material 5. In an embodiment, the electronically conductive material may be present in anode material 5 in an amount of about 10 wt. %, based on the total weight of the anode material 5. As will be appreciated by one of skill in the art, and with the help of this disclosure, the electronically conductive material is used in the non-flow cell Zn anode mixture as a conducting agent, e.g., to enhance the overall electronic conductivity of the non-flow cell Zn anode mixture. Nonlimiting examples of electronically conductive material suitable for use in in this disclosure include carbon, graphite, graphite powder, graphite powder flakes, graphite powder spheroids, carbon black, activated carbon, conductive carbon, amorphous carbon, glassy carbon, and the like, or combinations thereof.

The anode material 5 may also comprise a binder. In an embodiment, the binder can comprise any of the binders used with the cathode material 2 as described Generally, a binder functions to hold the electroactive material particles (e.g., Zn used in anode, etc.) together and in contact with the current collector. In an embodiment, the binder may be present in anode material 5 in an amount of from about 2 wt. % to about 10 wt. %, alternatively from about 2 wt. % to about 7 wt. %, or alternatively from about 4 wt. % to about 6 wt. %, based on the total weight of the anode material 5. In an embodiment, the binder may be present in anode material 5 in an amount of about 5 wt. %, based on the total weight of the anode material 5.

In an embodiment, the binder may comprise a polymer; a fluoropolymer, polytetrafluoroethylene (PTFE), a copolymer of tetrafluoroethylene and propylene; polyvinylidene fluoride (PVDF), a copolymer of styrene and butadiene, styrene-butadiene rubber (SBR); a conducting polymer, polyaniline, polypyrrole, poly(3,4-ethylenedioxylthiophene) (PEDOT), copolymers of 3,4-ethylenedioxylthiophene with various co-monomers (e.g., PEDOT with various dopants), a copolymer of 3,4-ethylenedioxylthiophene and styrene-sulfonate (PEDOT:PSS), polyvinyl alcohol (PVA), hydroxymethyl cellulose (HMC), carboxymethyl cellulose (CMC), and the like, or combinations thereof. In an embodiment, the binder used in a anode material 5 can comprise TEFLON, which is a PTFE commercially available from DuPont.

The anode material 5 can be coupled to the anode current collector 4, where the anode current collector 4 can include any of the current collectors described with respect to the cathode current collector 1. In general, the current collector acts as an electron carrier and a surface upon which zinc can be deposited during charging of the battery. In some embodiments, the current collector comprises a porous metal collector further comprising a variety of collector configurations, such as for example a metal conductive mesh, a metal conductive interwoven mesh, a metal conductive expanded mesh, a metal conductive screen, a metal conductive plate, a metal conductive foil, a metal conductive perforated plate, a metal conductive perforated foil, a metal conductive perforated sheet, a sintered porous metal conductive sheet, a sintered metal conductive foam, an expanded conductive metal, a perforated conductive metal, and the like, or combinations thereof. Other porous collector configurations of the current collector will be appreciated by one of skill in the art in light of this disclosure. In some embodiments, the current collector can comprise a metal collector pocketed assembly. The anode current collector can comprise silver, bismuth, copper, cadmium, lead, iron, nickel, indium, tin, or any combinations of these metals. Other current collector configurations will be apparent to one of skill in the art, and with the help of this disclosure.

In an embodiment, the anode current collector 4 may further comprise a current collector tab. In such embodiment, the current collector tab may comprise a metal, nickel, copper, steel, and the like, or combinations thereof. Generally, the current collector tab provides a means of connecting the electrode to the electrical circuit of the battery. In an embodiment, the current collector tab is in electrical contact with an outer surface of the electrode. In an embodiment, the current collector tab is in electrical contact with less than about 0.2% of an outer surface of the electrode, alternatively less than about 0.5%, or alternatively less than about 1%.

In an embodiment, the anode material 5 may be pressed onto the anode current collector 4 to yield the anode. In an embodiment, the anode material 5 may be in the form of a dried sheet or a paste that can be pressed onto the current collector under high pressure, such as for example a pressure of from about 3,000 psi to about 10,000 psi, alternatively about 5,000 psi to about 9,000 psi, or alternatively about 6,000 psi to about 8,000 psi. In an embodiment, the anode material 5 may be pressed onto the anode current collector 4 such that the anode material 5 is in electrical contact with at least a portion of an outer surface of the anode current collector 4.

In an embodiment, the cell 10 can comprise an electrolyte that serves as an ion transporter such as an aqueous battery electrolyte or an aqueous electrolyte. In an embodiment, the electrolyte can comprises any suitable aqueous electrolyte comprising ionic conductivity and with a pH value between 1 and 14. In an embodiment, the electrolyte has a pH value of about 14, alternatively less than about 14, alternatively less than about 13, or alternatively less than about 12. In the case of rechargeable batteries, the electrolyte is important both for the active/discharging cycle of the battery (while the battery supplies a current) and for the recharging cycle when Zn may be electrodeposited to replenish the anode material.

In an embodiment, the electrolyte comprises a hydroxide such as potassium hydroxide, sodium hydroxide, lithium hydroxide, cesium hydroxide, or any combination thereof, in a concentration of from about 1 wt. % to about 50 wt. %, alternatively from about 10 wt. % to about 40 wt. %, or alternatively from about 25 wt. % to about 35 wt. %, based on the total weight of the non-flow cell electrolyte solution. In an embodiment, the electrolyte comprises potassium hydroxide in a concentration of about 30 wt. %, based on the total weight of the electrolyte within the cell 10. The non-flow rechargeable zinc-anode battery base electrolyte may comprise an acidic electrolyte, zinc sulfate or zinc chloride. The pH of the electrolyte can vary from 0-15.

In some embodiments, the electrolyte contains organic additives, inorganic additives or combination of both.

In some embodiments, the electrolyte can comprise an organic additive, which can be present in addition to other additives. Organic additives can comprise one or more alkyl quaternary ammonium compounds. Alkyl quaternary ammonium compounds can include, but are not limited to, aliphatic quaternary ammonium compounds such as aliphatic quaternary ammonium compounds. This type of compound can include a halogenated salt but does not require it. For example, the organic additive can include an ammonium bromide salt such as hexadecyltrimethyl ammonium bromide (CTAB), ammonium bromide, tetrapropylammonium bromide, terakis(decyl)ammonium bromide, (12-Dodecylphosphonic acid)N,N-Dimethyl-N-octadecyl ammonium bromide, trimethyltetradecylammonium bromide, myristyltrimethylammonium bromide, domiphen bromide, (1-(4-methoxy-benzoyl)-undecyl)trimethyl-ammonium bromide, (2-dodecanoylamino-ethyl)-dimethyl-tetradecyl-ammonium bromide, 3-benzyl-3H-benzothiazol-2-ylidene-ammonium bromide, acetyl-benzyl-diethyl-ammonium bromide, allyloxycarbonylmethyl-ethyl-ammonium bromide, allyloxycarbonylmethyl-trimethyl-ammonium bromide, benzyloxycarbonylmethyl-triethyl-ammonium bromide, benyloxycarbonylmethyl-trimethyl-ammonium bromide, bis-decyl-diethyl-ammonium bromide, decyl-dimethyl-(2,3,4,5,6-pentahydroxy-hexyl)-ammonium bromide, decyl-tris-(2-decyloxy-ethyl)-ammonium bromide, dibenzyl-methoxycarbonylmethyl-ammonium bromide, diethylmethyl(2-(3-methyl-2-phenylvaleryloxy)-ethyl) ammonium bromide, trimethyl(2,4,5-trimethylbenzyl)ammonium bromide, trimethyl-(2-oxo-benzothiazol-3-ylmethyl)-ammonium bromide, stearyltrimethyl ammonium bromide, tetrabutylammonium bromide, sodium dodecyl trimethyl ammonium bromide or combination of these bromide compounds. One of ordinary skill in the art, with the benefit of this disclose, could use many more combinations of organic groups attached to ammonium bromide, and thus, this list is not intended to be exhaustive of the ammonium bromide compounds that can be used. In some embodiments, the additives can be combined with sodium dodecyl benzene sulfonate (SDBS), salicylaldehyde (SAL), benzylideneacetone (BDA), benzylacetone (BA) and butylbenzene (BB) additives to enhance the effects. The effects of organic additives are to modify the morphology of zinc deposition and suppress the self-discharge of zinc anode. In some embodiments, ammonium compounds can comprise tetramethyl-ammonium chloride (TMAC) and/or tetrabutyl-ammonium (TBAC). In some embodiments, the organic additives can comprise benzyl alcohol, naphthalin, benzyl chloride, coumarin, decylamine (DA), 1-decano (DE), dihydrocoumarin, sorbitol, aniline, or any combination thereof.

In some embodiments, organic additives can also comprise other kind of surfactant, like F1110 ($C_6F_{13}C_2H_4$ $(OC_2H_4)_{12}OH$), a nonionic surfactant (e.g., nonionic surfactant FC-170C, anionic surfactant FC-129, etc.), a cationic surfactant (e.g., cationic surfactant FC-135), triton X-10, triton X-100, sodium methylene bis (naphthalene sulfonate) (NNO), phenylbenzylketone (PBK), CH-I, sodium dodecyl sulfate (SDS), sodium lauryl sulphate (SLS), sodium dodecyl benzene sulphonate, or any combination thereof. In some embodiments, organic additives can comprise some polymer compounds, such as polyethylene glycol (PEG) with different molecular weight (PEG 200, PEG 300, PEG 400, PEG 600, PEG 900, PEG 1000, PEG 3000, PEG 10000 and PEG 20000), polyethylene oxide with different molecular weight, dicarboxylic acid modified PEG, polypropylene glycol (PPG) 725, terathane, PEG dodecyl ether, PEG diacid 600, brij30, brij 35 (compounds containing a main component ethylene oxide group), polyoxyethylene alkyl phosphate ester acid (GAFAC RA 600), polyacrylamide thiourea, chloride solution-ethoxylated-polyflouro-alcohol (FPEA), benzoic acid (BA), 1,4-bis(2-etylhexyl) sulphosuccinate (AOT), thiourea (TU), cellulose, or any combination thereof. Other organic additives can comprise a polyol, like glycerol. In some embodiments, organic additives can comprise some glues, including animal glue and some gum, like porcine skin, fish oil, arabic gum, glycine, gum tragacanth, gum ghatti, dammer, croda K5V, croda K1V, pearl, pepsine, thiourea, gelatine and xanthan gum.

In some embodiments, the additives can comprise carbonyl compounds, thiosemicarbazide and their thiosemicarbazone derivatives such as thiosemicarbazide (TSC), furfuraldehyde (FrA), salcylaldehyde (SaA), crotonaldehyde (CrA), acetophenone (AcP), furfuraldehydethiosemicarbazone (FrTSCN), salcylaldehyde thiosemicarbazone (SaTSCN), cinnamaldehydethiosemicarbazone (CnTSCN), crotonaldehydethiosemicarbazone (CrTSCN), acetophenonethiosemicarbazone (ApTsCN), or any combination thereof.

In some embodiments, the additives can comprise a rochelle salt (RS), nicotinic acid (NA), triethanolamine (TEA), tetra-ethylene pentammine (TEPA), polyvinyl alcohol (PVA), polyamine PA-1, polyamine PA-II, imidazole-polyamine (PA-Imid), trisodium nitrilotriacetic (NTA), thiourea, dextrin, vanillin (VA), Piperonal (PA), veratraldehyde (VER), anisaldehyde (ANI), benzimidazole (BZ), PVA, bis (2-ethylhexyl) sodium sulfosuccinate (AOT), (N-[(IE)-(4 methoxyphenyl)methylene] hydrazinecarbothioamide (ATSC), disodium ethylenediaminetetraacetate (EDTA), damssisa, hlfabar, piperonal, or any combination thereof.

In some embodiments, the additives can comprise sodium citrate, potassium sodium tartrate, calcium gluconate, phosphoric acid, acetic acid, tartaric acid, succinic acid, citric acid, hydroxyphenylpropionic acid, benzoic acid, or any combination thereof.

In some embodiments, the additives can comprise metal compounds which have a higher over potential for hydrogen generation (harder for hydrogen to form), like bismuth compound, indium compound, antimony compound, manganese compound, tin compound, lead compound, cadmium compound, silver oxide, or any combinations thereof. These additives can be added as a combination in order to have a synergic corrosion inhibiting effect. These additives can be present in the form of organic or inorganic metal compounds such as oxides, acetates, nitrates, carbonates, chlorides, sulfates, or any combination thereof.

In some embodiments, the additives can be added into the electrolyte, the electrodes, or combination of both ways. When added in the electrodes, some amount of the additives may dissolve into the electrolyte during cycling of the battery.

In some embodiments, CTAB, SDS, polyethylene oxide (PEO), bismuth oxide and tin sulfate are added into electrolyte with a pH of about 15. In some embodiments, the concentration of CTAB can be between about 0.1 mg/L to about 10 g/L. In some embodiments, the concentration of tin sulfate can be between about 0.1 mg/L to about 10 g/L. In some embodiments, the concentration of PEO can be between about 0.1 mg/L and about 10 g/L. In some embodiments, the concentration of bismuth oxide can be between about 0.1 ppm and about 20 ppm. In some embodiments, the concentration of SDS can be between about 0.1 mg/L and about 10 g/L.

In an embodiment, the cell 10 may be assembled by using any suitable methodology. In an embodiment, the cell 10 may comprise at least one anode and at least one cathode. In an embodiment, the cell 10 may comprise more than one anode and more than one cathode, wherein the anodes and the cathodes are assembled in an alternating configuration, e.g., the anodes and the cathodes are sandwiched together in an alternating manner. For example, if a cell 10 comprises two cathodes and three anodes, the electrodes would be sandwiched together in an alternating manner: anode, cathode, anode, cathode, and anode. In some embodiments, the cell 10 can be constructed with one or more anodes and one or more cathodes having a rolled configuration. For example, an anode and cathode can be layered and then rolled to create a rolled structure with a cross-section comprising an anode, cathode, anode, cathode, etc. in an alternating configuration. As will be appreciated by one of skill in the art, and with the help of this disclosure, the number of electrodes in a cell 10 is dependent upon the desired parameters for such cell 10, including consideration such as the size and properties of the electrodes, such that anode and the cathode capacities may be at least approximately balanced.

As described herein, the separator 3 forms an electrically insulating barrier between the anode and the cathode while being porous to allow for ionic flow in the electrolyte between the electrodes. By being placed between the electrodes, the separator 3 serves to prevent shorting that could occur due to direct electrical contact between the electrodes. As will be appreciated by one of skill in the art, the separator 3 allows the electrolyte, or at least a portion and/or component thereof, to pass (e.g., cross, traverse, etc.) through the electrode separator membrane, to balance ionic flow and sustain the flow of electrons in the battery. In this regard, the separator 3 serves to demarcates the cathode from the anode.

The separator 3 may comprise one or more layers. Suitable layers can include, but are not limited to, a polymeric separator layer such as a sintered polymer film membrane, polyolefin membrane, a polyolefin nonwoven membrane, a cellulose membrane, a cellophane, a battery-grade cellophane, a hydrophilically modified polyolefin membrane, and the like, or combinations thereof. As used herein, the phrase "hydrophilically modified polyolefin" refers to a polyolefin whose contact angle with water is less than 45°. In another embodiment, the contact angle with water is less than 30°. In yet another embodiment, the contact angle with water is less than 20°. The polyolefin may be modified by, for example, the addition of TRITON X-100™ or oxygen plasma treatment. In some embodiments, the separator 3 can comprise a CELGARD® brand microporous separator. In an embodiment, the separator 3 can comprise a FS 2192 SG membrane, which is a polyolefin nonwoven membrane commercially available from Freudenberg, Germany.

The layers can be present in a variety of configurations. In some embodiments, one or more of the layers can be wrapped around the anode and/or cathode. In some embodiments, a multi-layer structure can be used between the electrodes, where a portion of any one or more of the layers can optionally extend around one or more of the electrodes.

In an embodiment, the secondary battery can comprise a flow-assisted secondary battery. In this configuration, the electrolyte can be disposed within the housing to freely flow between the anode(s) and/or the cathode(s). The flow-assisted secondary battery can comprise a housing, a an anode, a cathode, and an electrolyte solution, where the Zn anode, the cathode, and the electrolyte solution may be located inside the battery housing. In some embodiments, the anode, the cathode, and/or the electrolyte can comprise any of the anode materials, cathode materials, and/or electrolyte materials described herein with respect to the non-flow secondary battery. As with the non-flow batteries described herein, the flow-assisted rechargeable zinc-anode battery may comprise a prismatic configuration, cylindrical configuration, bi-polar configuration, or coin cell configuration. The flow-assisted rechargeable zinc-anode battery comprises an anode current collector and the current collector may have a flat surface or cylindrical dimension. The anode current collector can be silver, bismuth, copper, cadmium, lead, iron, nickel, indium and tin and combinations of these metals.

The flow-assisted battery housing is configured to contain the anode(s), the cathode(s), and the electrolyte solution and provide for a flow path for the circulation of the electrolyte solution with respect to the anode(s) and cathode(s). In an embodiment, the battery housing comprises a molded box or container that is generally non-reactive with respect to the electrolyte solution. In an embodiment, the housing comprises a polypropylene molded box, an acrylic polymer molded box, or the like.

In an embodiment, the flow-assisted secondary battery may be assembled using any suitable methodology. The flow-assisted secondary battery may comprise at least one Zn anode and at least one cathode. In an embodiment, the secondary battery may comprise more than one flow-assisted cell Zn anode. As will be appreciated by one of skill in the art, and with the help of this disclosure, the number of electrodes in a flow-assisted secondary battery can depend upon the desired parameters for such secondary battery. In an embodiment, the number of electrodes (e.g., flow-assisted cell Zn anode, the cathode) in a flow-assisted secondary battery can be chosen based on the size and properties of the electrodes.

An embodiment of a flow-assisted secondary batter is shown in FIG. 3A. The electrodes are enclosed in a housing 50 which comprises at least two ports 30 for circulating the electrolyte solution. In some embodiments, the battery housing 50 may not comprise any ports and an internal fluid circulation device such as a pump may be used to circulate the fluid within the battery housing 50. Two Zn anodes are located on inner surfaces of the battery housing 50, wherein the Zn anodes face each other (e.g., the Zn anodes can be located on inner surfaces of the battery housing 50 that face each other or are diametrically opposed to each other). The Zn anodes comprise a current collector 40 and electrodeposited Zn 20. A cathode 10 can be located in the middle of the battery housing 50, between the two Zn anodes. While described as having the cathode 10 between the Zn anodes, other configurations are also possible.

Referring to the embodiment of FIG. 3B, a side view schematic of the flow-assisted secondary battery 200 of FIG. 3A is shown. The Zn anodes comprising a current collector 40 and electrodeposited Zn 20 are also visible in FIG. 3B, along with the cathode 10. The side view schematic of FIG. 3B also shows both ports 30 which allow for the flow-assisted cell electrolyte solution to be circulated, according to the electrolyte flow arrows 31, wherein a first port (e.g., inlet port) is located in a lower region of the flow-assisted battery housing and a second port (e.g., outlet port) is located in an upper region of the flow-assisted battery housing. This configuration of ports in the flow-assisted battery housing could ensure a vertical flow of flow-assisted cell electrolyte solution between adjacent electrodes (e.g., Zn anode, the cathode). In an alternative embodiment, the first port located in the lower region of the flow-assisted battery housing could be the outlet port and the second port located in the upper region of the flow-assisted battery housing could be the inlet port.

In an embodiment, a means for circulating the flow-assisted cell electrolyte solution comprises a pump, which pumps the flow-assisted cell electrolyte solution through the flow-assisted battery housing (e.g., through the ports in the flow-assisted battery housing). As will be appreciated by one of skill in the art, and with the help of this disclosure, alternative methods could be utilized for circulating the e flow-assisted cell electrolyte solution between the positive and negative electrodes (e.g., the Zn anode, the cathode). For example, an internal stirrer or mixer could be provided within the battery housing and an external drive shaft could be mechanically coupled to the stirrer or mixer to rotate same in order to circulate the flow-assisted cell electrolyte solution.

One or more spacers can be used to physically separate the electrodes in the secondary battery. In an embodiment, the spacers may comprise materials which (i) are chemically stable in the flow-assisted cell electrolyte solution and (ii) have high electrical resistance. Nonlimiting examples of materials suitable for use in the spacers include nylon, acrylonitrile-butadiene-styrene copolymers (ABS), PTFE, acrylic polymers, polyolefins, and the like.

In an embodiment, during a cycle of operation of the flow-assisted battery the ZnO can be deposited as metallic Zn on the current collectors of the Zn anodes during charging. As the battery discharges in use, the metallic zinc deposited on the current collectors of the Zn anodes can be oxidized to form a zinc oxide, which then dissolves back into the flow-assisted cell electrolyte solution.

The flow-assisted cell electrolyte solution may be continuously circulated through the flow-assisted battery housing as previously described herein, thereby keeping the flow-assisted cell electrolyte solution well stirred and ensuring an even, homogenous mixture and temperature of the flow-assisted cell electrolyte solution. Without wishing to be limited by theory, the concentration of zinc species (e.g., ZnO) in the flow-assisted cell electrolyte solution decreases during charging of the secondary battery, and the continuous circulation of the flow-assisted cell electrolyte solution may maintain the concentration of the zinc species uniform throughout the solution, thereby minimizing Zn dendrite formation and ensuring an uniform deposition of Zn onto the flow-assisted cell Zn anode.

In an embodiment, continuous circulation of the flow-assisted cell electrolyte solution through the flow-assisted battery housing may allow complete dissolution of all Zn from the flow-assisted cell Zn anode during discharge. In such embodiment, the secondary battery can be subjected to a reconditioning cycle, wherein all Zn could be dissolved/removed from the flow-assisted cell Zn anode, thereby allowing the flow-assisted cell Zn anode to return to its original condition (e.g., condition prior to utilizing the flow-assisted secondary battery). In an embodiment, the reconditioning cycle can be performed periodically during a life of the flow-assisted secondary battery to improve performance of the battery and lengthen the life of the battery. The use of the additives in the electrolyte solution described herein may help to lengthen the time between the reconditioning cycles.

In an embodiment, a method of producing energy may comprise the steps of: (i) providing a flow-assisted secondary battery assembled as disclosed herein; (ii) charging the flow-assisted secondary battery to a charge voltage, wherein ZnO from the flow-assisted cell electrolyte solution is deposited as electrodeposited Zn on the current collector of the flow-assisted cell Zn anode; (iii) discharging the flow-assisted secondary battery to a discharge voltage to produce energy, wherein at least a portion of the electrodeposited Zn of the flow-assisted cell Zn anode is oxidized and transferred back into the flow-assisted cell electrolyte solution; (iv) optionally further discharging the flow-assisted secondary battery to a final voltage below said discharge voltage, wherein the electrodeposited Zn of the flow-assisted cell Zn anode is completely removed from the flow-assisted cell Zn anode; and (v) continuously circulating the flow-assisted cell electrolyte solution through the flow-assisted battery housing during said steps of charging, discharging and further discharging the flow-assisted secondary battery to said final voltage, wherein the electrodeposited Zn is stripped and re-deposited on the current collector of the flow-assisted cell Zn anode. During this process, the electrolyte can comprise any of the additives described herein.

EXAMPLES

The disclosure having been generally described, the following examples are given as particular embodiments of the disclosure and to demonstrate the practice and advantages thereof. It is understood that the examples are given by way of illustration and are not intended to limit the specification or the claims in any manner.

Example 1

The following example provides details relating to the composition, fabrication and performance characteristics of zinc-anode batteries. It should be understood the following is representative only, and that the invention is not limited by the detail set forth in these examples.

Experiments were carried out for zinc anode-nickel cathode batteries. The cell configuration was a prismatic and the cell was flow-assisted. The electrolyte was 60 g/L ZnO (0.74 mol/L) dissolved in 37% potassium hydroxide (9 mol/L). The KOH solution was freshly prepared by dissolving analytical reagent (AR)-grade KOH (Sigma-Aldrich) pellets in deionized water. A small-scale flow assisted cell having a 0.18 Ah capacity was test at 1 C rate and the cutoff potential for the end of charge (EOC) was 1.95 V and 1.2 V for the end of discharge (EOD). Three large-scale flow-assisted cells were fabricated also in the prismatic configuration. All of them had 113 Ah capacity. The utilization of nickel electrode was 80% and the utilization of zinc electrode was 35%. The electrolytes in Cell 1 and Cell 2 were 37% KOH with 60 g/L ZnO and with the presence of 60 mg/L additive CTAB. The electrolyte in control experiment Cell 3 was the standard electrolyte, 37% KOH mixed with 60 g/L ZnO. The charge rates for Cell 1, Cell 2, and Cell 3 were 1 C, 2 C, and 1C respectively. As used herein, a 1C rate means 1-hour charge and 1-hour discharge with an absolute value of 91 A for charging and discharging current. 2 C rate means half an hour charge and half an hour discharge with absolute value of 182 A for charging and discharging current. The cutoff potential for Cell 1 and Cell 3 were 1.95 V for the end of charge and 1 V for the end of discharge. The cutoff potential for Cell 2 was 2 V for the end of charge and 1.2 V for the end of discharge.

Figure 3:
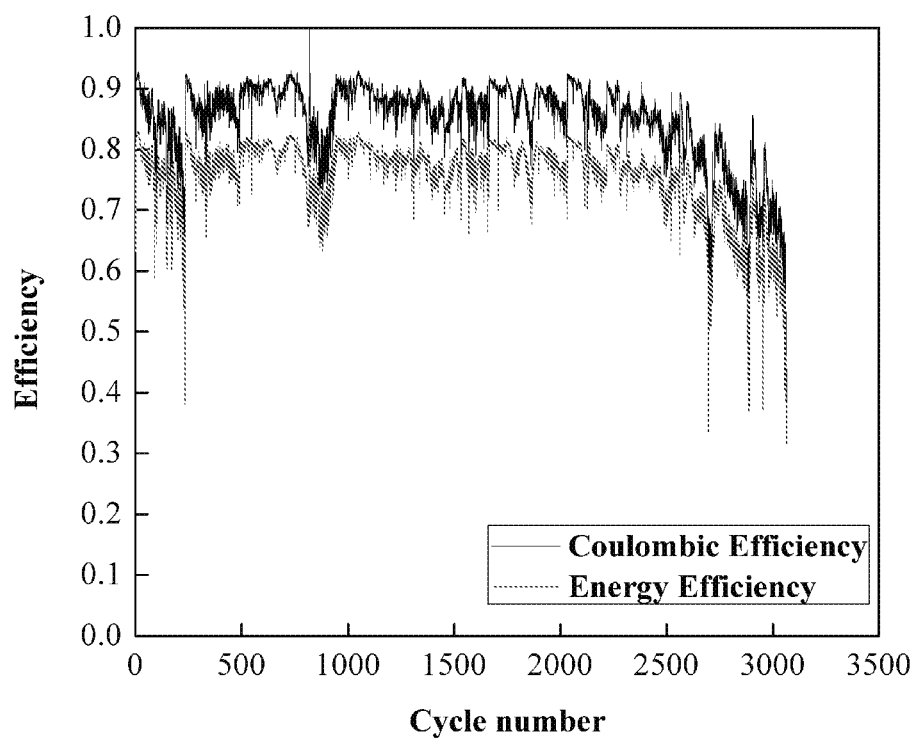
FIG. 3 shows the performance of small-scale flow-assisted cell.

FIG. 3 shows the performance of the small-scale flow-assisted cell (0.18 Ah). It shows that with hexadecyltrimethyl ammonium bromide (CTAB) in the electrolyte, the small-scale flow cell runs at long cycle life (>2500 cycles) at good coulombic and energy efficiency without any deep cleaning steps.

Figure 4:
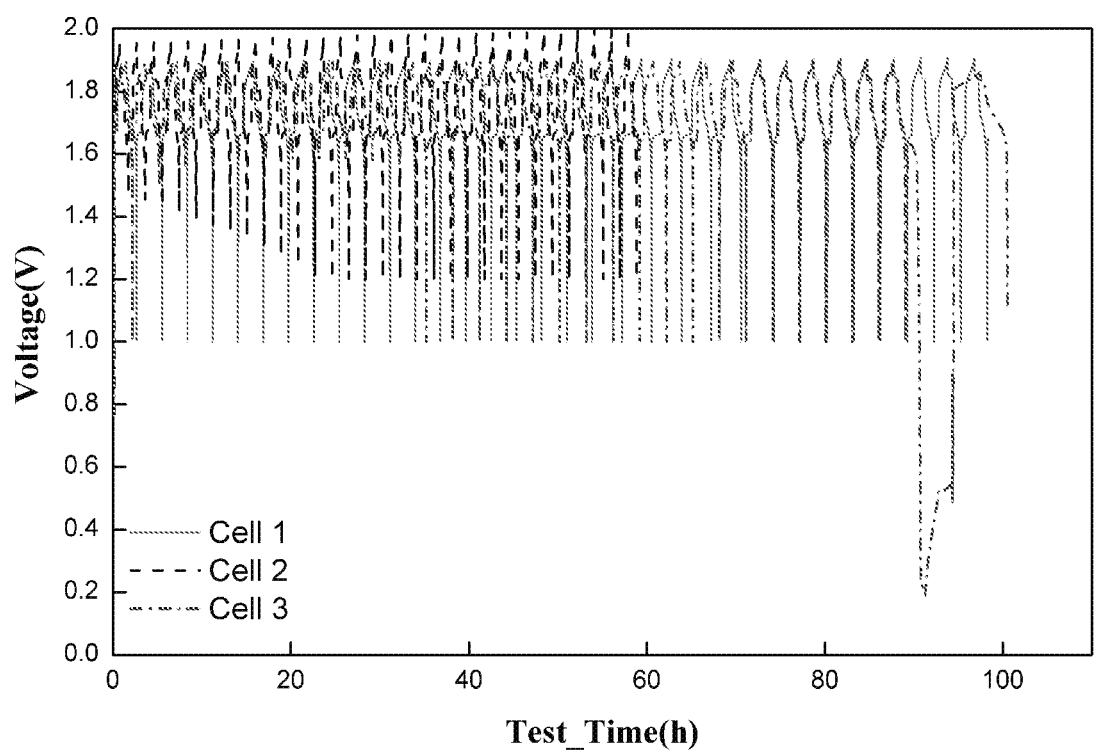
FIG. 4 shows the potential curve of the first 30 cycles of large-scale flow-assisted cells (113 Ah).

FIG. 4 shows the potential curve of the first 30 cycles of the large-scale flow-assisted cells (113 Ah). This curve shows that for the control cell, Cell 3, after 30 cycles, the zinc was built up so that the potential drops drastically to 0.2 V, which results in the failure of this cell. It may be due to the morphology of zinc being mossy and fluffy; where the adhesive of this type of zinc is poor so that the capacity of the cell is lost.

Figure 5:
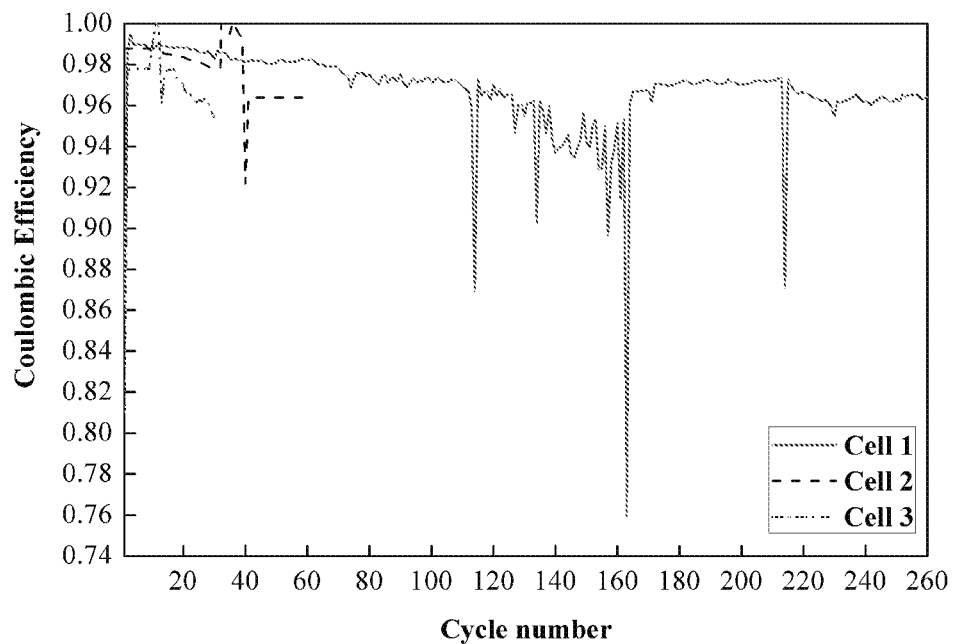
FIG. 5 is the plot of the coulombic efficiency of large-scale flow-assisted cells.

FIG. 5 is a plot of the coulombic efficiency of the large-scale flow-assisted cells (113 Ah). This plot demonstrates that with the presence of CTAB as the electrolyte additive. Cell 1 and Cell 2 have longer cycle life than the control experiment, Cell 3, which deteriorates after 30 cycles. In the case of Cell 1, the drops in the efficiency at the $114^{th}$, $162^{nd}$, and $212^{th}$ cycles were due to the corrosion testing that was being studied. Later after 100 cycles, zinc also built up in the cell, which caused the fluctuation of the efficiency from the $100^{th}$ cycle to the $165^{th}$ cycle. After the zinc dissolved back into the solution, Cell 1 ran back to normal again and the efficiency curve went back to a steady line.

Figure 6:
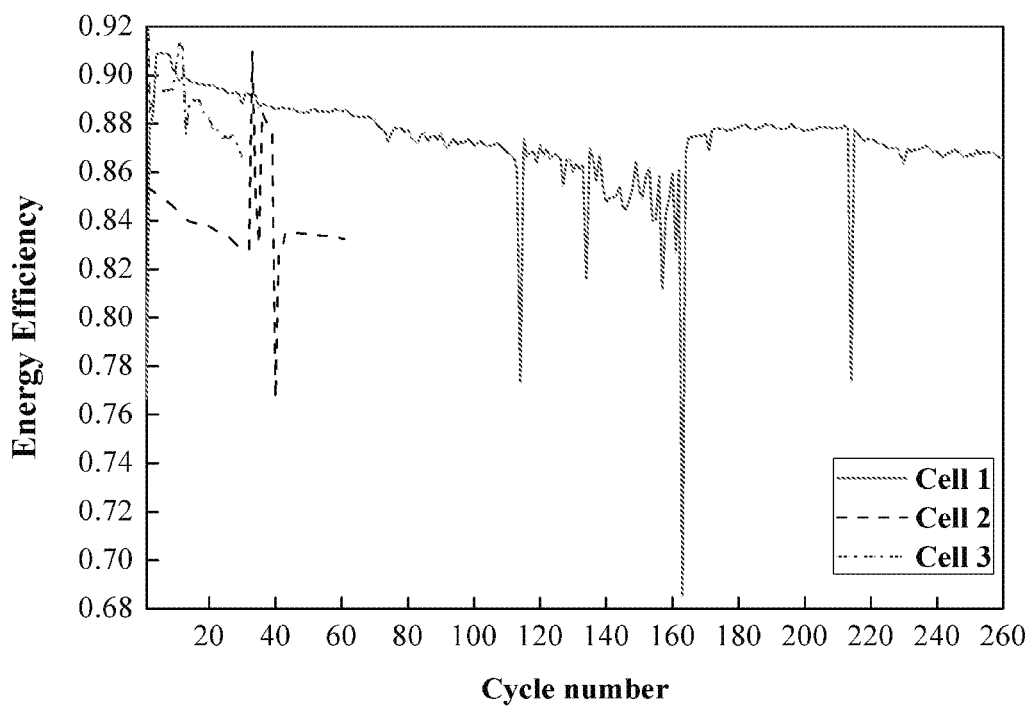
FIG. 6 shows the energy efficiency of large-scale flow-assisted cell.

FIG. 6 shows the energy efficiency of the large-scale flow-assisted cell (113 Ah). It also illustrates that with the presence of CTAB, the cells have a longer cycle life.

Figure 7:
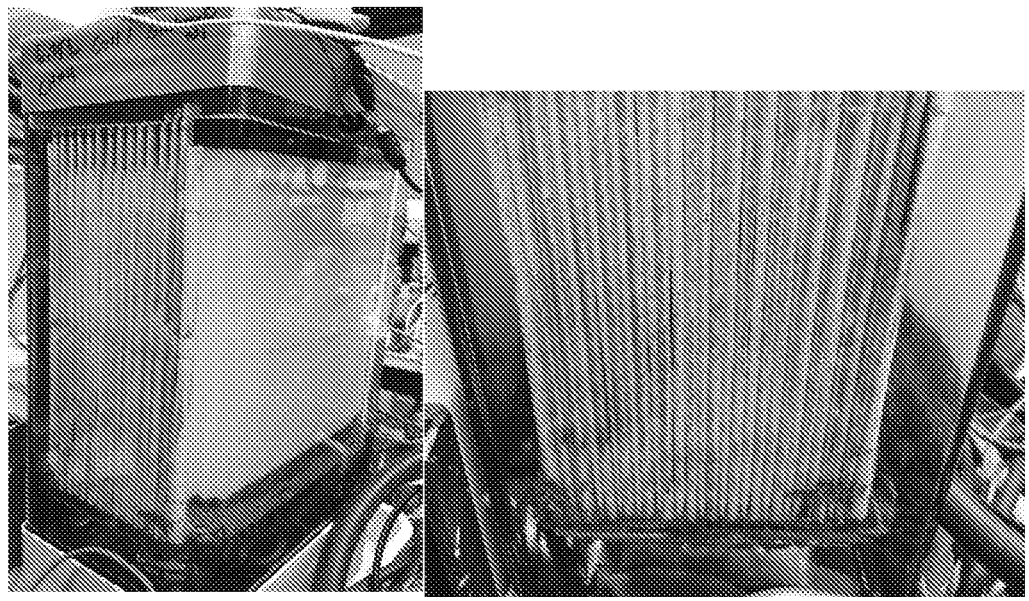
FIG. 7 shows a picture of a test cell at the end of the 114th charge.

FIG. 7 shows the picture of Cell 1 at the end of $114^{th}$ charge. It can be seen that with the presence of CTAB in the electrolyte, the morphology of zinc deposition is modified compared to FIG. 9.

Figure 8:
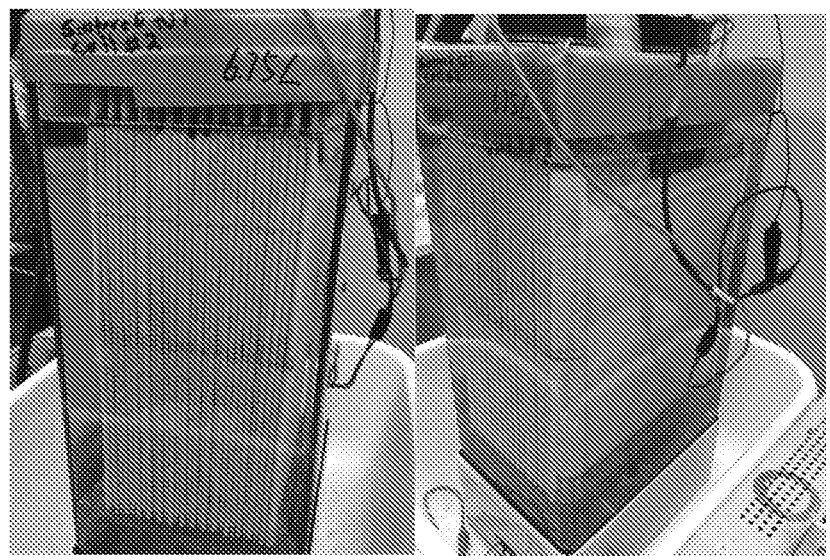
FIG. 8 shows a picture of another test cell at the end of the 50th charge.

FIG. 8 shows the picture of Cell 2 at the end of the $50^{th}$ charge. In this picture, it shows that the morphology of zinc deposition is compact and dense, which is desirable in zinc-anode rechargeable batteries.

Figure 9:
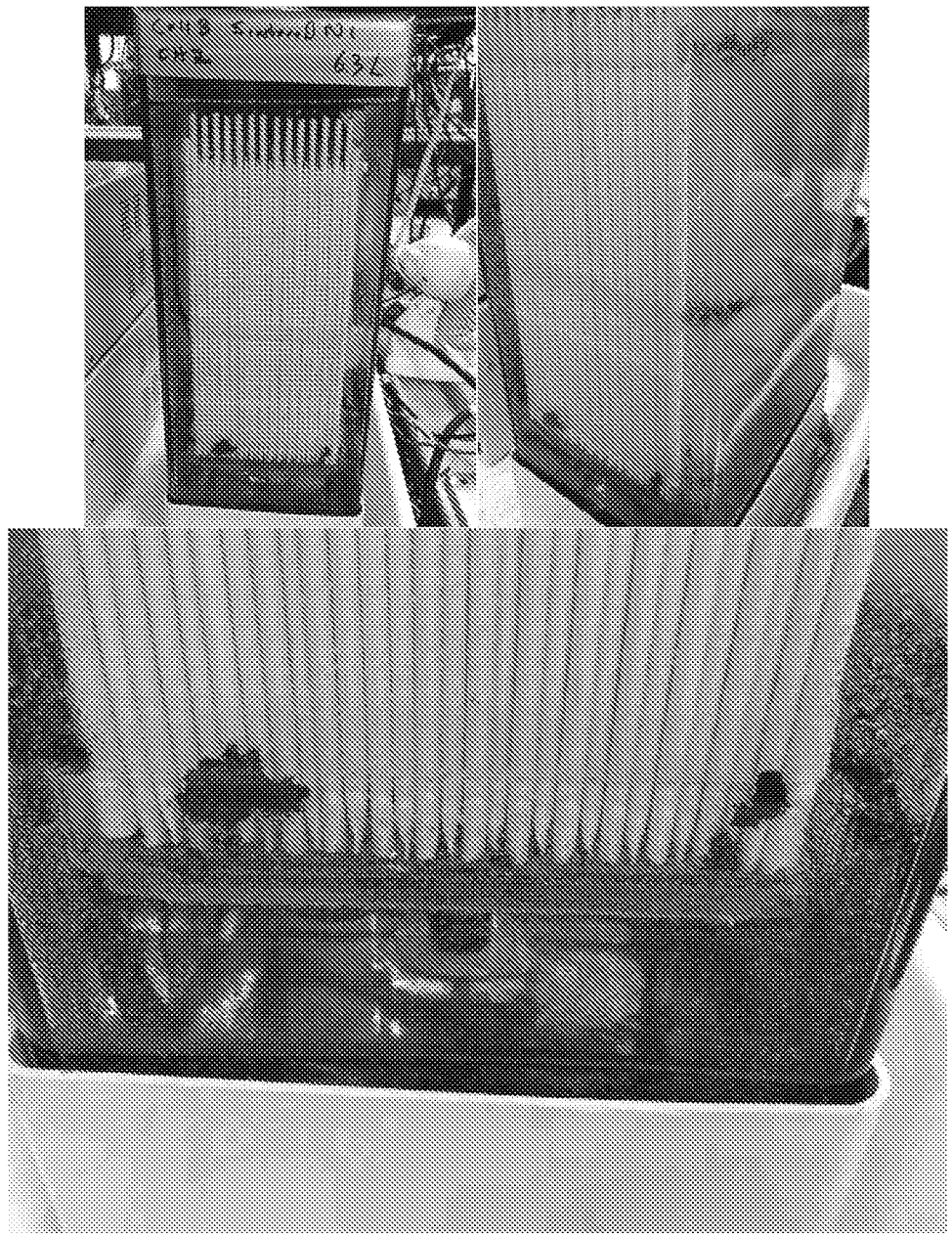
FIG. 9 shows a picture of still another test cell at the end of the 30th charge.

FIG. 9 shows the picture of Cell 3 at the end of $30^{th}$ charge. As the control experiment, Cell 3 deteriorated faster than the other two cells and the morphology of zinc deposition is mossy and highly porous as shown in the picture. Furthermore, in this picture, it shows more gas bubbles than Cell 1 and Cell 2.

Example 2

Figure 10:
FIG. 10 shows a picture of a string of flow assisted batteries according to an Example.
Figure 11:
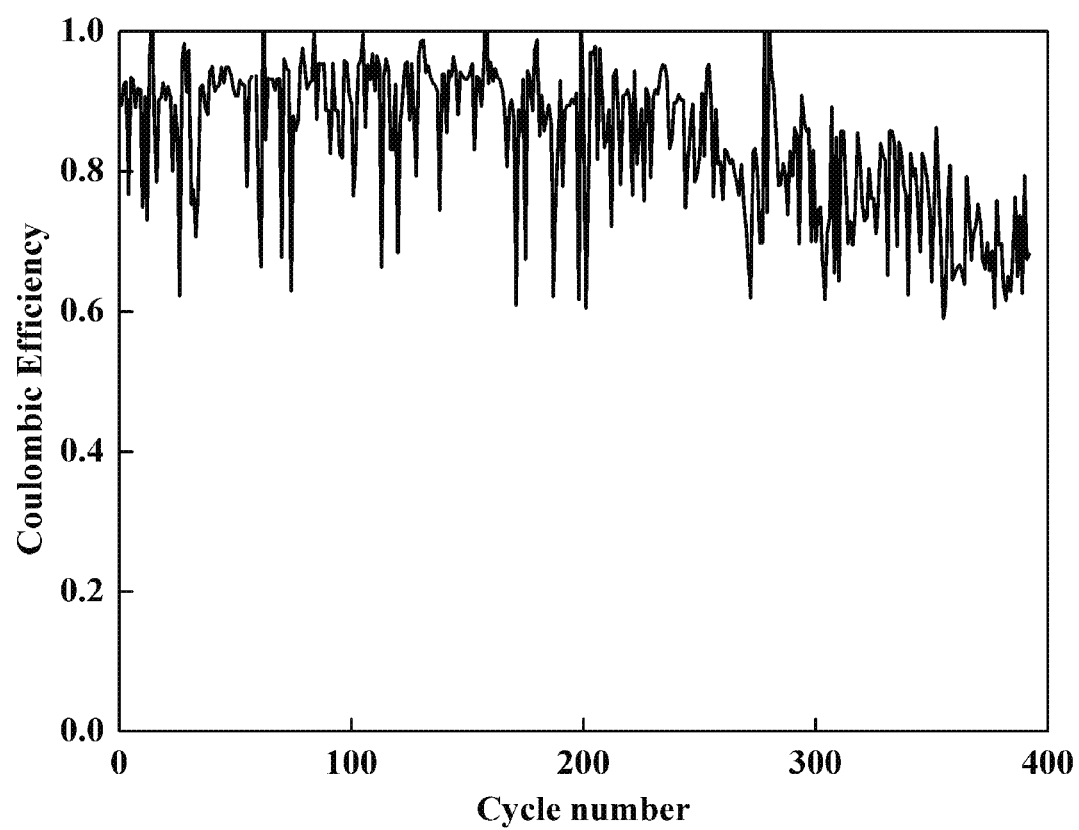
FIG. 11 shows a plot of the Coulombic efficiencies of the string of flow assisted batteries illustrated in FIG. 10.

Experiments were also conducted on a 50 KWh flow-assisted zinc-nickel battery string. The battery string contained 4 racks of cells in parallel and in each rack there were 52 cells in series. The capacity of each cell was 140 Ah. Each cell was fabricated in prismatic configuration, as shown in FIG. 10. The electrolytes in the battery string were 37% KOH with 60 g/L ZnO and with the presence of 60 mg/L additive CTAB. For the first 250 cycles, the string was running at 1C charge rate and 1C discharge rate. From 250 cycles to 400 cycles, the charge and discharge rates increased to 2C. The results in FIG. 11 show the performance of the 50 KWh zinc-nickel battery string with the presence of CTAB additive. At 1C charge-discharge rate, the battery string demonstrated 90%+coulombic efficiency and at 2C charge-discharge rate, the battery string demonstrated 80%+coulombic efficiency.

Having described various devices and processes herein, specific embodiments can include, but are not limited to:

In a first embodiment, a zinc-anode rechargeable battery comprises: a cathode; an anode current collector; an electrolyte in ionic communication with both the cathode and the anode current collector, the electrolyte comprising an organic ammonium halide, a tin salt and polyethylene oxide; and a zinc anode comprising zinc.

In a second embodiment, a zinc-anode rechargeable battery comprises a cathode, the cathode can be nickel, sodium, vanadium, lithium, bromine, chlorine, cadmium, copper, silver, manganese oxide or air; an anode current collector, the anode current collector having a high resistance to corrosion in electrolyte; and an electrolyte in ionic communication with both the cathode and the anode current collector; and a zinc anode comprising pasted mixture of zinc paste, zinc oxide, and binder, etc. or zinc oxide as zincate in the electrolyte.

A third embodiment can include the battery of the second embodiment, wherein the cathode comprises nickel, such as nickel oxide hydroxide or nickel oxyhydroxide (often referred to as nickel oxide or nickel hydroxide, respectively).

A fourth embodiment can include the battery of the second embodiment, wherein the cathode comprises manganese, such as manganese dioxide.

A fifth embodiment can include the battery of the second embodiment, wherein the cathode can comprises vanadium, cadmium, bromide, copper, chlorine, lithium, silver, air, or sodium separately.

A sixth embodiment can include the battery of the second embodiment, wherein the battery is a non-flow rechargeable zinc-anode battery with a battery housing that comprises a non-flow battery housing, wherein the zinc anode is a non-flow cell zinc anode, and the electrolyte comprises a non-flow cell electrolyte solution.

A seventh embodiment can include the battery of the sixth embodiment, wherein the battery has a configuration selected from the group consisting of a prismatic configuration, a cylindrical configuration, a bi-polar configuration, and a coin cell configuration.

An eighth embodiment can include the battery of the second embodiment, wherein the anode current collector has a flat surface or a cylindrical dimension and the anode current collector acts as an electron carrier.

A ninth embodiment can include the battery of the second embodiment, wherein the anode current collector is silver, bismuth, copper, cadmium, lead, iron, nickel, indium, tin or combinations of these metals.

A tenth embodiment can include the battery of the sixth embodiment, wherein the electrolyte comprises a hydroxide solution of potassium hydroxide, sodium hydroxide, lithium hydroxide, cesium hydroxide or any combination thereof in a concentration of from 1 wt. % to about 50 wt. % based on the total weight of the electrolyte.

An eleventh embodiment can include the battery of the sixth embodiment, wherein the electrolyte is an acidic electrolyte, zinc sulfate or zinc chloride.

A twelfth embodiment can include the battery of the sixth embodiment, wherein the electrolyte has a pH between 0-15.

A thirteenth embodiment can include the battery of the second embodiment, wherein the battery is a flow-assisted rechargeable zinc-anode battery with a battery case that comprises a flow-assisted battery housing, wherein the zinc anode comprises a flow-assisted cell zinc anode, and wherein the electrolyte comprises a flow-assisted cell electrolyte solution.

A fourteenth embodiment can include the battery of the thirteenth embodiment, wherein the battery has a prismatic configuration, a cylindrical configuration, a bi-polar configuration, or a coin cell configuration.

A fifteenth embodiment can include the battery of the thirteenth embodiment, wherein the anode current collector has a flat surface or a cylindrical dimension, wherein the anode current collector acts as an electron carrier.

A sixteenth embodiment can include the battery of the thirteenth embodiment, wherein the anode current collector is silver, bismuth, copper, cadmium, lead, iron, nickel, indium, tin or combinations of these metals.

A seventeenth embodiment can include the battery of the thirteenth embodiment, wherein the electrolyte solution may comprises a hydroxide solution of potassium hydroxide, sodium hydroxide, lithium hydroxide, cesium hydroxide or any combination thereof in a concentration of from 1 wt. % to about 50 wt. % based on the total weight of the electrolyte.

An eighteenth embodiment can include the battery of the thirteenth embodiment, wherein the electrolyte comprises an acidic electrolyte, zinc sulfate or zinc chloride.

A nineteenth embodiment can include the battery of the thirteenth embodiment, wherein the electrolyte has a pH between 0-15.

A twentieth embodiment can include the battery of the second embodiment, wherein the anode current collector is comprises Ag, Bi, Cu, Cd, In, Pb, Fe, Ni or Sn or combinations of thereof.

A twenty first embodiment can include the battery of the second embodiment, wherein the electrolyte has a pH between 0-15.

A twenty second embodiment can include the battery of the second embodiment, wherein the electrolyte comprises one or more hydroxides selected from the group consisting of potassium hydroxide, sodium hydroxide, and lithium hydroxide.

A twenty third embodiment can include the battery of the sixth embodiment, wherein the electrolyte is configured to flow along the cathode and the anode current collector as the battery charges.

A twenty fourth embodiment can include the battery of the sixth embodiment, further comprising a pump configured to cause the electrolyte to flow.

A twenty fifth embodiment can include the battery of the second embodiment, wherein the electrolyte is configured to flow along the cathode and the anode current collector as the battery cycles.

A twenty sixth embodiment can include the battery of the second embodiment, wherein the electrolyte contains an organic additive, an inorganic additive or combination of both.

A twenty seventh embodiment can include the battery of the second embodiment, wherein the anode contains an organic additive, an inorganic additive or combination of both.

A twenty eighth embodiment can include the battery of the twenty sixth embodiment, wherein the organic additive is an alkyl quaternary ammonium compound.

A twenty ninth embodiment can include the battery of the twenty eighth embodiment, wherein the alkyl quaternary ammonium compound is an aliphatic quaternary ammonium compound.

A thirtieth embodiment can include the battery of the twenty ninth embodiment, wherein the alkyl quaternary ammonium compound is an aliphatic quaternary ammonium compound.

A thirty first embodiment can include the battery of the thirtieth embodiment, wherein the aliphatic quaternary ammonium compound is a halogenated salt.

A thirty second embodiment can include the battery of the thirtieth embodiment, wherein the aliphatic quaternary ammonium compound is an ammonium bromide.

A thirty third embodiment can include the battery of the thirtieth embodiment, wherein the aliphatic quaternary ammonium compound is selected from the group consisting of hexadecyltrimethyl ammonium bromide (CTAB), ammonium bromide, tetrapropylammonium bromide, terakis (decyl)ammonium bromide, (12-Dodecylphosphonic acid) N,N-Dimethyl-N-octadecyl ammonium bromide, trimethyltetradecylammonium bromide, myristyltrimethylammonium bromide, domiphen bromide, (1-(4-methoxybenzoyl)-undecyl)-trimethyl-ammonium bromide, (2-dodecanoylamino-ethyl)-dimethyl-tetradecyl-ammonium bromide, 3-benzyl-3H-benzothiazol-2-ylidene-ammonium bromide, acetyl-benzyl-diethyl-ammonium bromide, allyloxycarbonylmethyl-ethyl-ammonium bromide, allyloxycarbonylmethyl-trimethyl-ammonium bromide, benzyloxycarbonylmethyl-triethyl-ammonium bromide, benyloxycarbonylmethyl-trimethyl-ammonium bromide, bis-decyl-diethyl-ammonium bromide, decyl-dimethyl-(2,3,4,5,6-pentahydroxy-hexyl)-ammonium bromide, decyl-tris-(2-decyloxy-ethyl)-ammonium bromide, dibenzyl-methoxycarbonylmethyl-ammonium bromide, diethylmethyl(2-(3-methyl-2-phenylvaleryloxy)-ethyl) ammonium bromide, trimethyl(2,4,5-trimethylbenzyl)ammonium bromide, trimethyl-(2-oxo-benzothiazol-3-ylmethyl)-ammonium bromide, stearyltrimethyl ammonium bromide, tetrabutylammonium bromide, sodium dodecyl trimethyl ammonium bromide or combination of these bromide compounds. Other organic additives could include sodium dodecyl benzene sulfonate (SDBS), salicylaldehyde (SAL), benzylideneacetone (BDA), benzylacetone (BA) and butylbenzene (BB).

A thirty fourth embodiment can include the battery of the thirtieth embodiment, wherein the aliphatic quaternary ammonium compound is selected from the group consisting of tetramethylammonium chloride (TMAC) and tetrabutylammonium (TBAC).

A thirty fifth embodiment can include the battery of the twenty sixth embodiment, wherein the organic additive is benzyl alcohol, naphthalin, benzyl chloride, coumarin, decylamine (DA), 1-decano (DE), dihydrocoumarin, sorbitol or aniline.

A thirty sixth embodiment can include the battery of the twenty sixth embodiment, wherein organic additive is a surfactant.

A thirty seventh embodiment can include the battery of the thirty sixth embodiment, wherein the surfactant is selected from the group consisting of F1110 (C6F13C2H4 (OC2H4)12OH), nonionic surfactant FC-170C, cationic surfactant FC-135, anionic surfactant FC-129, triton X-10, triton X-100, sodium methylene bis (naphthalene sulfonate) (NNO), phenylbenzylketone (PBK), CH-1, sodium dodecyl sulfate (SDS), sodium lauryl sulphate (SLS), sodium dodecyl benzene sulphonate or combination thereof.

A thirty eighth embodiment can include the battery of the twenty sixth embodiment, wherein the organic additive is polymer compound.

A thirty ninth embodiment can include the battery of the thirty eighth embodiment, wherein the polymer compound is polyethylene glycol (PEG), polyethylene oxide, dicarboxylic acid modified PEG, polypropylene glycol (PPG) 725, terathane, PEG dodecyl ether, PEG diacid 600, brij30, brij 35, a polymer compound containing a main component ethylene oxide group, polyoxyethylene alkyl phosphate ester acid (GAFAC RA 600), polyacrylamide thiourea, chloride solution-ethoxylated-polyflouro-alcohol (FPEA), benzoic acid (BA), 1,4-bis(2-etylhexyl) sulphosuccinate (AOT), thiourea (TU), or cellulose.

A fortieth embodiment can include the battery of the thirty eighth embodiment, wherein the polymer compound is a polyol.

A forty first embodiment can include the battery of the thirty eighth embodiment, wherein the polymer compound is glycerol.

A forty second embodiment can include the battery of the twenty sixth embodiment, wherein the organic additives is a glue.

A forty third embodiment can include the battery of the forty second embodiment, wherein the glue is animal glue.

A forty fourth embodiment can include the battery of the twenty sixth embodiment, wherein the organic additive is a gum.

A forty fifth embodiment can include the battery of the forty fourth embodiment, wherein the gum is porcine skin, fish oil, arabic gum, glycine, gum tragacanth, gum ghatti, dammer, croda K5V, croda K1V, pearl, pepsine, thiourea, gelatine or xanthan gum.

A forty sixth embodiment can include the battery of the thirty eighth embodiment, wherein the polymer compound is PEG 200, PEG 300, PEG 400, PEG 600, PEG 900, PEG 1000, PEG 3000, PEG 10000 or PEG 20000.

A forty seventh embodiment can include the battery of the twenty sixth embodiment, wherein the organic additive is a carbonyl compound, a thiosemicarbazide, a thiosemicarbazone derivative, a thiosemicarbazide (TSC), furfuraldehyde (FrA), salcylaldehyde (SaA), crotonaldehyde (CrA), acetophenone (AcP), furfuraldehydethiosemicarbazone (FrTSCN), salcylaldehyde thiosemicarbazone (SaTSCN), cinnamaldehydethiosemicarbazone (CnTSCN), crotonaldehydethiosemicarbazone (CrTSCN) or acetophenonethiosemicarbazone (ApTsCN).

A forty eighth embodiment can include the battery of the twenty sixth embodiment, wherein the organic additive is rochelle salt (RS), nicotinic acid (NA), triethanolamine (TEA), tetra-ethylene pentammine (TEPA), polyvinyl alcohol (PVA), polyamine PA-I, polyamine PA-II, imidazolepolyamine (PA-Imid), trisodium nitrilotriacetic (NTA), thiourea, dextrin, vanillin (VA), Piperonal (PA), veratraldehyde (VER), anisaldehyde (ANI), benzimidazole (BZ), PVA, bis (2-ethylhexyl) sodium sulfosuccinate (AOT), (N-[(1E)-(4 methoxyphenyl)methylene] hydrazinecarbothioamide (ATSC), disodium ethylenediaminetetraacetate (EDTA), damssisa, hlfabar and piperonal.

A forty ninth embodiment can include the battery of the twenty sixth embodiment, wherein the inorganic additive is sodium citrate, potassium sodium tartrate, calcium gluconate, phosphoric acid, acetic acid, tartaric acid, succinic acid, citric acid, hydroxyphenylpropionic acid or benzoic acid.

A fiftieth embodiment can include the battery of the twenty sixth embodiment, wherein the inorganic additive comprises a metal compound which has higher overpotential for hydrogen to generate.

A fifty first embodiment can include the battery of the fiftieth embodiment, wherein the metal compound is a bismuth compound, a indium compound, an antimony compound, a manganese compound, a tin compound, a lead compound, a cadmium compound, or a silver oxide.

A fifty second embodiment can include the battery of the twenty sixth embodiment, wherein more than one of the inorganic additives are added as a combination in order to have a synergic corrosion inhibiting effect.

A fifty third embodiment can include the battery of the fiftieth embodiment, wherein the metal compounds is an oxide, an acetates, a nitrate, a carbonate, a chloride, a sulfate or a combination thereof.

A fifty fourth embodiment can include the battery of the twenty sixth embodiment, wherein the organic additive or the inorganic additive are present in the electrolyte, the anode current collector, or both.

A fifty fifth embodiment can include the battery of the twenty sixth embodiment, wherein CTAB, SDS, polyethylene oxide (PEO), bismuth oxide and tin sulfate are added into the electrolyte with pH 15.

A fifty sixth embodiment can include the battery of the fifty fifth embodiment, wherein the concentration of the CTAB is between 1 mg/L to 1 g/L.

A fifty seventh embodiment can include the battery of the fifty fifth embodiment, wherein the concentration of the tin sulfate is between 0.1 mg/L to 1 g/L.

A fifty eighth embodiment can include the battery of the fifty fifth embodiment, wherein the concentration of the bismuth oxide is 0.1 ppm-20 ppm.

A fifty ninth embodiment can include the battery of the fifty fifth embodiment, wherein the concentration of the SDS is 0.1 mg/L to 1 g/L.

A sixtieth embodiment can include the battery of the second embodiment, wherein the electrolyte contains an organic additive CTAB, SDS and PEO and inorganic additives tin sulfate and bismuth oxide.

A sixty first embodiment can include the battery of the fifty fifth embodiment, wherein the concentration of the CTAB is between 0.1 mg/L to 10 g/L.

A sixty second embodiment can include the battery of the fifty fifth embodiment, wherein the concentration of the SDS is between 0.1 mg/L to 10 g/L.

A sixty third embodiment can include the battery of the fifty fifth embodiment, wherein the concentration of the PEO is between 0.1 mg/L to 10 g/L.

A sixty fourth embodiment can include the battery of the fifty fifth embodiment, wherein the concentration of the tin sulfate is between 0.1 mg/L to 10 g/L.

A sixty fifth embodiment can include the battery of the second embodiment, wherein the anode current collector will not degrade along with battery cycling for a long period.

A sixty sixth embodiment can include the battery of any of the thirty second to sixty first embodiments, wherein the additives modify the morphology of zinc and get more desirable zinc deposition.

A sixty seventh embodiment can include the battery of any of the sixty first to sixty fourth embodiments, wherein the organic additive and the inorganic additive have synergic effect of modifying zinc morphology and suppress zinc corrosion.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A rechargeable battery, comprising:
    a cathode, wherein the cathode comprises nickel, nickel oxide hydroxide, nickel oxyhydroxide, manganese dioxide, or any combination thereof;
    an anode current collector;
    an anode comprising zinc, wherein the zinc is present in the anode in an amount between 50 wt. % and 90 wt. %; and
    an aqueous electrolyte in ionic contact with both the cathode and the anode current collector, wherein the aqueous electrolyte comprises an organic quaternary ammonium halide.

2. The rechargeable battery of claim 1, wherein the aqueous electrolyte comprises a tin salt and polyethylene oxide.

3. The rechargeable battery of claim 1, wherein the cathode comprises nickel, nickel oxide hydroxide, nickel oxyhydroxide, or any combination thereof.

4. The rechargeable battery of claim 1, wherein the cathode comprises manganese dioxide.

5. The rechargeable battery of claim 1, wherein the cathode comprises vanadium, cadmium, bromide, copper, chlorine, lithium, silver, air, sodium, or any combination thereof.

6. The rechargeable battery of claim 1, wherein the aqueous electrolyte comprises an aqueous solution of potassium hydroxide, sodium hydroxide, lithium hydroxide, cesium hydroxide, or any combination thereof.

7. The rechargeable battery of claim 1, wherein the aqueous electrolyte is an acidic electrolyte comprising zinc sulfate, zinc chloride, or any combination thereof.

8. The rechargeable battery of claim 1, further comprising: a pump configured to cause the electrolyte to flow.

9. The rechargeable battery of claim 1, wherein the organic ammonium halide is selected from the group consisting of: hexadecyltrimethyl ammonium bromide (CTAB), ammonium bromide, tetrapropylammonium bromide, terakis(decyl)ammonium bromide, (12-Dodecylphosphonic acid)N,N-Dimethyl-N-octadecyl ammonium bromide, trimethyltetradecylammonium bromide, myristyltrimethylammonium bromide, domiphen bromide, (1-(4-methoxy-benzoyl)-undecyl)-trimethyl-ammonium bromide, (2-dodecanoylamino-ethyl)-dimethyl-tetradecyl-ammonium bromide, 3-benzyl-3H-benzothiazol-2-ylidene-ammonium bromide, acetyl-benzyl-diethyl-ammonium bromide, allyloxycarbonylmethyl-ethyl-ammonium bromide, allyloxycarbonylmethyl-trimethyl-ammonium bromide, benzyloxycarbonylmethyl-triethyl-ammonium bromide, benyloxycarbonylmethyl-trimethyl-ammonium bromide, bis-decyl-di ethyl-ammonium bromide, decyl-dimethyl-(2,3,4,5,6-pentahydroxy-hexyl)-ammonium bromide, decyl-tris-(2-decyloxy-ethyl)-ammonium bromide, dibenzyl-methoxycarbonylmethyl-ammonium bromide, diethylmethyl(2-(3-methyl-2-phenylvaleryloxy)-ethyl) ammonium bromide, trimethyl(2,4,5-trimethylbenzyl)ammonium bromide, trimethyl-(2-oxo-benzothiazol-3-ylmethyl)-ammonium bromide, stearyltrimethyl ammonium bromide, tetrabutylammonium bromide, sodium dodecyl trimethyl ammonium bromide, tetramethylammonium chloride (TMAC), and any combination thereof.

10. The rechargeable battery of claim 1, wherein the aqueous electrolyte further comprises: an organic additive comprising sodium dodecyl benzene sulfonate (SDBS), salicylaldehyde (SAL), benzylideneacetone (BDA), benzylacetone (BA), butylbenzene (BB) or any combination thereof.

11. The rechargeable battery of claim 1, wherein the aqueous electrolyte further comprises: an organic additive comprising benzyl alcohol, naphthalin, benzyl chloride, coumarin, decylamine (DA), 1-decano (DE), dihydrocoumarin, sorbitol, aniline, or any combination thereof.

12. The rechargeable battery of claim 1, wherein the aqueous electrolyte further comprises: a surfactant selected from the group consisting of: F1110 ($C_6F_{13}C_2H_4(OC_2H_4)_{12}OH$), nonionic surfactant FC-170C, cationic surfactant FC-135, anionic surfactant FC-129, triton X-10, triton X-100, sodium methylene bis (naphthalene sulfonate) (NNO), phenylbenzylketone (PBK), CH-1, sodium dodecyl sulfate (SDS), sodium lauryl sulphate (SLS), sodium dodecyl benzene sulphonate, and any combination thereof.

13. The rechargeable battery of claim 1, wherein the aqueous electrolyte further comprises: an organic additive comprising a polymer compound, wherein the polymer compound comprises polyethylene glycol (PEG), polyethylene oxide, dicarboxylic acid modified PEG, polypropylene glycol (PPG) 725, terathane, PEG dodecyl ether, PEG diacid 600, brij30, brij 35, a polymer compound containing a main component ethylene oxide group, polyoxyethylene alkyl phosphate ester acid (GAFAC RA 600), polyacrylamide thiourea, chloride solution-ethoxylated-polyflouro-alcohol (FPEA), benzoic acid (BA), 1,4-bis(2-etylhexyl) sulphosuccinate (AOT), thiourea (TU), cellulose, or any combination thereof.

14. The rechargeable battery of claim 1, wherein the aqueous electrolyte further comprises: a polymer comprising glycerol, a glue, a gum, or any combination thereof.

15. The rechargeable battery of claim 1, wherein the aqueous electrolyte further comprises: a rochelle salt (RS), a nicotinic acid (NA), triethanolamine (TEA), tetra-ethylene pentammine (TEPA), polyvinyl alcohol (PVA), polyamine PA-I, polyamine PA-II, imidazole-polyamine (PA-Imid), trisodium nitrilotriacetic (NTA), thiourea, dextrin, vanillin (VA), Piperonal (PA), veratraldehyde (VER), anisaldehyde (ANI), benzimidazole (BZ), PVA, bis (2-ethylhexyl) sodium sulfosuccinate (AOT), (N-[(1E)-(4 methoxyphenyl)methylene] hydrazinecarbothioamide (ATSC), disodium ethylenediaminetetraacetate (EDTA), damssisa, hlfabar, piperonal, or any combination thereof.

16. The rechargeable battery of claim 1, wherein the aqueous electrolyte further comprises: sodium citrate, potassium sodium tartrate, calcium gluconate, phosphoric acid, acetic acid, tartaric acid, succinic acid, citric acid, hydroxyphenylpropionic acid, benzoic acid, or any combination thereof.

17. The rechargeable battery of claim 1, wherein the aqueous electrolyte further comprises: a metal compound which has higher over potential for hydrogen than zinc.

18. A rechargeable battery, comprising:
a cathode, wherein the cathode comprises nickel, nickel oxide hydroxide, nickel oxyhydroxide, manganese dioxide, or any combination thereof,
an anode current collector,
an anode comprising zinc, wherein the zinc is present in the anode in an amount between 50 wt. % and 90 wt. %; and
an aqueous electrolyte in ionic contact with both the cathode and the anode current collector, wherein the aqueous electrolyte comprises an alkyl quaternary ammonium compound.

19. The rechargeable battery of claim 18, wherein the cathode comprises nickel, sodium, vanadium, lithium, bromine, chlorine, cadmium, copper, silver, or manganese oxide.

20. The rechargeable battery of claim 18, wherein the anode current collector is resistant to corrosion in the electrolyte.

21. The rechargeable battery of claim 18, wherein the anode comprises a pasted mixture of zinc paste, zinc oxide, and binder.

22. The rechargeable battery of claim 18, wherein the alkyl quaternary ammonium compound is hexadecyltrimethyl ammonium bromide (CTAB).

23. The rechargeable battery of claim 18, wherein the alkyl quaternary ammonium compound is an aliphatic quaternary ammonium compound.

24. The rechargeable battery of claim 23, wherein the aliphatic quaternary ammonium compound is a halogenated salt.

25. The rechargeable battery of claim 23, wherein the aliphatic quaternary ammonium compound is an ammonium bromide.

26. The rechargeable battery of claim 23, wherein the aliphatic quaternary ammonium compound is selected from the group consisting of hexadecyltrimethyl ammonium bromide (CTAB), ammonium bromide, tetrapropylammonium bromide, terakis(decyl)ammonium bromide, (12-Dodecylphosphonic acid)N,N-Dimethyl-N-octadecyl ammonium bromide, trimethyltetradecylammonium bromide, myristyltrimethylammonium bromide, domiphen bromide, (1-(4-methoxy-benzoyl)-undecyl)-trimethyl-ammonium bromide, (2-dodecanoylamino-ethyl)-dimethyl-tetradecyl-ammonium bromide, 3-benzyl-3H-benzothiazol-2-ylidene-ammonium bromide, acetyl-benzyl-diethyl-ammonium bromide, allyloxycarbonylmethyl-ethyl-ammonium bromide, allyloxycarbonylmethyl-trimethyl-ammonium bromide, benzyloxycarbonylmethyl-triethyl-ammonium bromide, benyloxycarbonylmethyl-trimethyl-ammonium bromide, bis-decyl-di ethyl-ammonium bromide, decyl-dimethyl-(2, 3,4,5,6-pentahydroxy-hexyl)-ammonium bromide, decyl-tris-(2-decyloxy-ethyl)-ammonium bromide, dibenzyl-methoxycarbonylmethyl-ammonium bromide, diethylmethyl(2-(3-methyl-2-phenylvaleryloxy)-ethyl) ammonium bromide, trimethyl(2,4,5-trimethylbenzyl)ammonium bromide, trimethyl-(2-oxo-benzothiazol-3-ylmethyl)-ammonium bromide, stearyltrimethyl ammonium bromide, tetrabutylammonium bromide, sodium dodecyl trimethyl ammonium bromide, and a combination of these bromide compounds.

27. A method of operating a battery comprising:
discharging a battery, wherein the battery comprises:
a cathode, wherein the cathode comprises nickel, nickel oxide hydroxide, nickel oxyhydroxide, manganese dioxide, or any combination thereof;
an anode current collector;
an anode comprising zinc, wherein the zinc is present in the anode in an amount between 50 wt. % and 90 wt. %; and
an aqueous electrolyte in ionic contact with both the cathode and the anode current collector, wherein the aqueous electrolyte comprises an alkyl quaternary ammonium compound;
dissolving zinc in the electrolyte during the discharging;
charging the battery; and
plating zinc on the anode current collector during the charging.

28. The method of claim 27, further comprising:
circulating the aqueous electrolyte in contact with the cathode and the anode during the discharging and charging.

29. The method of claim 27, wherein the alkyl quaternary ammonium compound comprises an organic ammonium halide.

30. The method of claim 29, wherein the aqueous electrolyte further comprises a tin salt, and polyethylene oxide.

* * * * *